United States Patent
Takeda

(10) Patent No.: US 12,510,085 B2
(45) Date of Patent: Dec. 30, 2025

(54) VACUUM PUMP

(71) Applicant: Edwards Japan Limited, Yachiyo (JP)

(72) Inventor: Shunsuke Takeda, Yachiyo (JP)

(73) Assignee: Edwards Japan Limited, Yachiyo (JP)

( * ) Notice: Subject to any disclaimer, the term of this patent is extended or adjusted under 35 U.S.C. 154(b) by 0 days.

(21) Appl. No.: 18/836,721

(22) PCT Filed: Mar. 3, 2023

(86) PCT No.: PCT/JP2023/008069
§ 371 (c)(1),
(2) Date: Aug. 7, 2024

(87) PCT Pub. No.: WO2023/171566
PCT Pub. Date: Sep. 14, 2023

(65) Prior Publication Data
US 2025/0163920 A1    May 22, 2025

(30) Foreign Application Priority Data

Mar. 11, 2022  (JP) ................................ 2022-038281

(51) Int. Cl.
*F04D 19/04*      (2006.01)
*F04D 29/40*      (2006.01)

(52) U.S. Cl.
CPC .......... *F04D 19/042* (2013.01); *F04D 29/403* (2013.01)

(58) Field of Classification Search
CPC ...... F04D 19/04; F04D 19/042; F04D 29/403; F04D 29/52; F04D 29/522; F01D 25/24;

(Continued)

(56) References Cited

U.S. PATENT DOCUMENTS 6,752,588 B2 *  6/2004  Kawanishi ............ F04D 29/601
                                                  415/214.1
7,798,788 B2 *  9/2010  Varennes .............. F04D 19/042
                                                  417/423.15

(Continued)

FOREIGN PATENT DOCUMENTS

EP    2149716 A2 *  2/2010  ............ F16B 37/145
JP    H06260329 A    9/1994

(Continued)

OTHER PUBLICATIONS

Office Action, and translation thereof, from counterpart Japanese Application No. 2022-038281 dated Jul. 25, 2024, 8 pp.

(Continued)

*Primary Examiner* — Courtney D Heinle
*Assistant Examiner* — Cameron A Corday
(74) *Attorney, Agent, or Firm* — Shumaker & Sieffert, P.A.

(57) ABSTRACT

Provided is a vacuum pump in which deformation of a peripheral part fastened to an outer cylinder can be prevented even when a count of bolts increases. A vacuum pump according to the present disclosure includes a rotating body, an outer cylinder that accommodates the rotating body, a peripheral part that is disposed on an outer perimeter side of the rotating body and concentrically with the outer cylinder, a plurality of bolts that fasten the outer cylinder and the peripheral part, and an axial force reducing means for reducing bolt axial force acting on the outer cylinder. The axial force reducing means is provided to at least one of the plurality of bolts.

9 Claims, 11 Drawing Sheets

(58) Field of Classification Search
CPC ........ F01D 25/28; F16B 19/02; F16B 5/0258; F16B 43/00
See application file for complete search history.

(56) References Cited

U.S. PATENT DOCUMENTS

| | | | | |
|---|---|---|---|---|
| 8,292,603 | B2* | 10/2012 | Nakamura | ............ F04D 29/601 |
| | | | | 417/423.4 |
| 8,414,258 | B2* | 4/2013 | Burdgick | .................. F01D 3/02 |
| | | | | 415/209.2 |
| 9,745,989 | B2* | 8/2017 | Tsutsui | .................. F04D 19/044 |
| 9,863,262 | B2* | 1/2018 | Shudo | .................. F16J 15/0887 |
| 10,316,695 | B2* | 6/2019 | Renggli | ................. F01D 25/005 |
| 11,346,364 | B2* | 5/2022 | Kunishi | ................ F04D 29/624 |
| 11,933,346 | B1* | 3/2024 | Letourneau | ........... F16B 35/041 |
| 2001/0012488 | A1* | 8/2001 | Ohtachi | .................. F04D 19/04 |
| | | | | 417/423.4 |
| 2023/0272806 | A1 | 8/2023 | Miwata et al. | |

FOREIGN PATENT DOCUMENTS

| | | |
|---|---|---|
| JP | H08118021 A | 5/1996 |
| JP | 2014095340 A | 5/2014 |
| JP | 2021067253 A | 4/2021 |
| WO | 2014045438 A1 | 3/2014 |

OTHER PUBLICATIONS

International Search Report and Written Opinion of International Application No. PCT/JP2023/008069, dated May 9, 2023, 9 Pages.

* cited by examiner and rotates at a high speed. When the rotating
VACUUM PUMP This application is a national stage entry under 35 U.S.C. § 371 of International Application No. PCT/JP2023/008069, filed Mar. 3, 2023, which claims the benefit of JP Application No. 2022-038281, filed Mar. 11, 2022, the entire contents of each of which are incorporated herein by reference.

TECHNICAL FIELD

The present disclosure relates to a vacuum pump.

SUMMARY OF THE INVENTION

Generally, in vacuum pumps represented by, for instance, turbomolecular pumps, a casing (outer cylinder) and peripheral parts (e.g., cooling spacer, base, etc.) are fastened by bolts, thus making up a housing of the vacuum pump. A rotating body that has rotor blades is accommodated within this casing, and rotates at a high speed. When the rotating body fails during operation of the vacuum pump, a great tortional torque (hereinafter referred to as "destructive torque") is generated in a rotating direction of the rotating body. The destructive torque acts on the bolts fastening the casing and the peripheral parts, and accordingly the bolts need to absorb this destructive torque.

In recent years, weight of the rotating body is in an increasing trend, due to increased size associated with increased workloads of pumps and change of materials to high-temperature tolerant materials associated with high-temperature demands. Greater weight of the rotating body means increased destructive torque, and the size and count of bolts increase accordingly as well. Accordingly, great axial force of the bolts is applied to the casing and the peripheral parts, and there is a possibility that the peripheral parts may be deformed. Particularly, in a case in which there is a gap between the casing and the peripheral parts in an axial direction, bending moment is applied to the peripheral parts under the axial force of the bolts, and there is a concern that the peripheral parts may be deformed.

Absorbing the increase in destructive torque without changing the axial force of the bolts can be realized by increasing a pitch circle diameter (PCD) of the bolts, for example, but this is undesirable since the vacuum pump will increase in size. Using high-strength bolts does away with the need to increase the count of bolts, but this has problems in that versatility is poor and costs increase.

Accordingly, it is an object of the present disclosure to provide a vacuum pump in which deformation of peripheral parts fastened to the outer cylinder can be prevented even if the count of bolts increases.

In order to achieve the above object, an aspect of the present disclosure is a vacuum pump, including: a rotating body; an outer cylinder that accommodates the rotating body; a peripheral part that is disposed on an outer perimeter side of the rotating body and concentrically with the outer cylinder; a plurality of bolts that fasten the outer cylinder and the peripheral part; and an axial force reducing means for reducing bolt axial force acting on the outer cylinder. The axial force reducing means is provided to at least one of the plurality of bolts.

Also, in the above configuration, the axial force reducing means preferably has a structure that forms a gap between a head portion of the bolt and a bolt fastening face that is an outer face of the outer cylinder and that faces the head portion of the bolt.

Also, in the above configuration, preferably, a plurality of through holes, through which the plurality of bolts are passed, are provided in the outer cylinder, a plurality of screw holes, into which the plurality of bolts are screwed, are provided in the peripheral part, a cylindrically shaped spacer serving as the axial force reducing means is inserted into at least one of the plurality of through holes, and the gap is formed between the head portion of the bolt and the bolt fastening face across the spacer.

Also, in the above configuration, preferably, a plurality of through holes, through which the plurality of bolts are passed, are provided in the outer cylinder, a plurality of screw holes, into which the plurality of bolts are screwed, are provided in the peripheral part, and the gap is formed between the head portion of the bolt and the bolt fastening face by at least one of the plurality of bolts functioning as the axial force reducing means by being formed to have a nominal length that is greater than a total value of a length of the through hole and a screwing depth of the screw hole.

Also, in the above configuration, preferably, a plurality of through holes, through which the plurality of bolts are passed, are provided in the outer cylinder, a plurality of screw holes, into which the plurality of bolts are screwed, are provided in the peripheral part, a stopper serving as the axial force reducing means is disposed at a bottom portion of at least one of the plurality of screw holes, and the gap is formed between the head portion of the bolt and the bolt fastening face by a tip end portion of the bolt coming into contact with the stopper.

Also, in the above configuration, the axial force reducing means preferably further includes an elastic member disposed in the gap.

Also, in the above configuration, a count of the bolts to which the axial force reducing means is provided is preferably smaller or less than a count of the bolts to which the axial force reducing means is not provided.

Also, in the above configuration, a count of the bolts to which the axial force reducing means is provided is preferably greater than a count of the bolts to which the axial force reducing means is not provided.

Also, in the above configuration, the plurality of bolts are preferably same bolts.

According to the vacuum pump of the present disclosure, deformation of peripheral parts fastened to the outer cylinder can be prevented even if the count of bolts increases. Note that problems, configurations and advantages, other than those described above, will become clear by description of an example below.

DETAILED DESCRIPTION

An example of a vacuum pump according to the present disclosure will be described below with reference to the Figures, by way of example of a turbomolecular pump.

Figure 1:
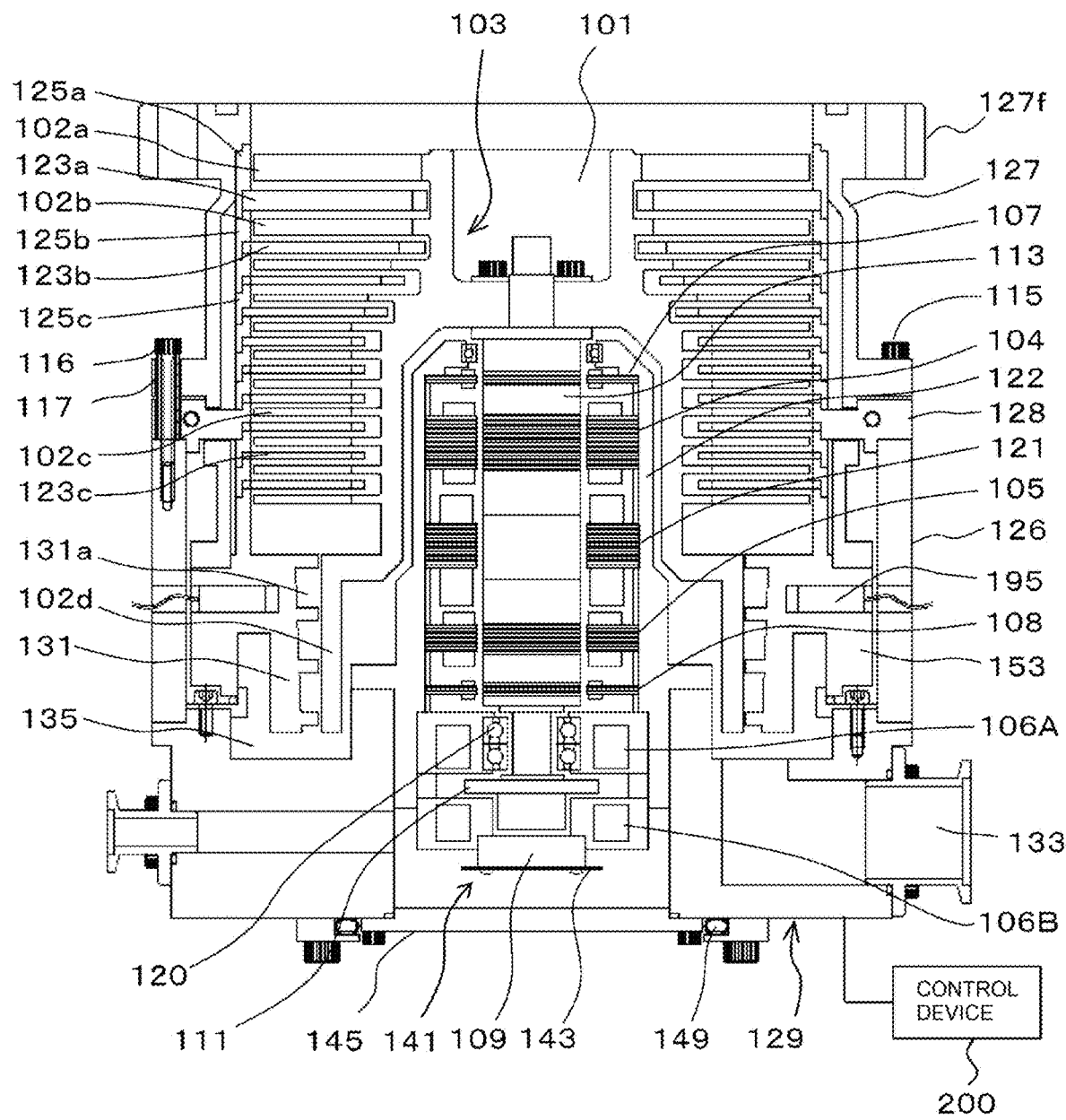
FIG. 1 is a longitudinal-sectional view of a turbomolecular pump according to an example of the present disclosure.

FIG. 1 is a longitudinal-sectional view of a turbomolecular pump 100. FIG. 1 is a configuration diagram of a turbomolecular pump used in the example of the present disclosure. In FIG. 1, an inlet port 101 is formed at an upper end of an outer cylinder 127, which is cylindrically shaped, in the turbomolecular pump 100. On an inner side of the outer cylinder 127, a rotating body 103 is provided. Provided extending radially on a peripheral portion of the rotating body 103 is a plurality of rotor blades 102 (102a, 102b, 102c . . . ) serving as turbine blades for suction and exhaust of gas, the rotor blades 102 are provided in a plurality of stages. A rotor shaft 113 is attached to a center of the rotating body 103, and the rotor shaft 113 is made to be supported by levitation in air and to be position-controlled by a five-axis control magnetic bearing, for example. The rotating body 103 is generally made of a metal such as aluminum, aluminum alloy, stainless, or the like.

Also, as illustrated in FIG. 1, a water cooling spacer 128 and an outer wall 126, which are peripheral parts, are disposed on an outer perimeter side of a rotating body 103. The water cooling spacer 128 is a ring-shaped member in which an annular cooling pipe 110 (see FIG. 6) is built in. Supplying coolant water to this cooling pipe 110 cools parts in the vicinity of the water cooling spacer 128. That is to say, heat generated by rotation of the rotating body 103 is cooled by the water cooling spacer 128. The outer wall 126 is a cylindrically shaped member that surrounds substantially a lower half of the turbomolecular pump 100. The water cooling spacer 128 and the outer wall 126 are disposed below the outer cylinder 127, concentrically with the outer cylinder 127 and in that order. The outer cylinder 127, the water cooling spacer 128, and the outer wall 126 are integrated by being fastened by a plurality of bolts 115 and 116, thus making up a housing (casing) of the turbomolecular pump 100 accommodating the rotating body 103, along with a base portion 129.

Upper-side radial-direction electromagnets 104 are four electromagnets, disposed in pairs on an X axis and a Y axis. Four upper-side radial-direction sensors 107 are provided in close proximity to the upper-side radial-direction electromagnets 104 and corresponding to each of the upper-side radial-direction electromagnets 104. Inductance sensors, eddy current sensors, or the like, having conducting windings, are used as the upper-side radial-direction sensors 107, for example. A position of the rotor shaft 113 is detected on the basis of change in inductance of the conducting windings that changes in accordance with the position of the rotor shaft 113. These upper-side radial-direction sensors 107 are configured to detect radial-direction displacement of the rotor shaft 113, i.e., of the rotating body 103 fixed thereto, to be sent to a control device 200.

In this control device 200, a compensating circuit having differential (PID) adjusting functions, for example, generates excitation control command signals for the upper-side radial-direction electromagnets 104 on the basis of position signals detected by the upper-side radial-direction sensors 107, and an amplifier circuit 150 (described later) illustrated in FIG. 2 performs excitation control of the upper-side radial-direction electromagnets 104 on the basis of these excitation control command signals, thereby adjusting a radial-direction position of an upper side of the rotor shaft 113.

This rotor shaft 113 is formed of a material having high magnetic permeability (iron, stainless steel, etc.) or the like, and is arranged to be suctioned by magnetic force of the upper-side radial-direction electromagnets 104. This adjustment is performed independently for an X-axial direction and a Y-axial direction. Lower-side radial-direction electromagnets 105 and lower-side radial-direction sensors 108 are also disposed in the same way as the upper-side radial-direction electromagnets 104 and the upper-side radial-direction sensors 107, and adjust the radial-direction position of a lower side of the rotor shaft 113 in the same way as with the radial-direction position of the upper side.

Further, axial-direction electromagnets 106A and 106B are disposed across a metal disc 111 that is disc-shaped and is provided at a lower portion of the rotor shaft 113, above and below. The metal disc 111 is made of a high magnetic permeability material such as iron or the like. An axial-direction sensor 109 is provided in order to detect displacement of the rotor shaft 113 in the axial direction, and is configured to send axial-direction position signals thereof to the control device 200.

In the control device 200, the compensating circuit having PID controller functions, for example, generates excitation control command signals for each of the axial-direction electromagnet 106A and the axial-direction electromagnet 106B on the basis of axial-direction position signals detected by the axial-direction sensor 109, and the amplifier circuit 150 performs excitation control of each of the axial-direction electromagnet 106A and the axial-direction electromagnet 106B on the basis of these excitation control command signals, whereby the axial-direction electromagnet 106A suctions the metal disc 111 upward by magnetic force and the axial-direction electromagnet 106B suctions the metal disc 111 downward, thereby adjusting the axial-direction position of the rotor shaft 113.

Thus, the control device 200 adjusts the magnetic force that the axial-direction electromagnets 106A and 106B apply to the metal disc 111 as appropriate, causing magnetic levitation of the rotor shaft 113 in the axial direction, so as to be held in air without contact. Note that the amplifier circuit 150 that performs excitation control of the upper-side radial-direction electromagnets 104, the lower-side radial-direction electromagnets 105, and the axial-direction electromagnets 106A and 106B, will be described later.

Also, a motor 121 is provided with a plurality of magnetic poles disposed perimetrically surrounding the rotor shaft 113. Each magnetic pole is controlled by the control device 200 so as to rotationally drive the rotor shaft 113 through electromagnetic force acting between itself and the rotor shaft 113. An unshown rotational velocity sensor, such a Hall device, a resolver, an encoder, or the like, for example, is assembled into the motor 121, and rotational velocity of the rotor shaft 113 is detected by detection signals from this rotational velocity sensor.

Further, an unshown phase sensor is attached in a proximity of the lower-side radial-direction sensors 108 for example, and is arranged to detect a phase of rotation of the rotor shaft 113. The control device 200 uses both of detection signals of this phase sensor and the rotational velocity sensor to detect the position of the magnetic poles.

A plurality of stator blades 123 (123a, 123b, 123c . . . ) is disposed with a slight spacing as to the rotor blades 102 (102a, 102b, 102c . . . ). The rotor blades 102 (102a, 102b, 102c . . . ) are each formed inclined at a predetermined angle from a plane perpendicular to an axial line of the rotor shaft 113, in order to transport molecules of exhaust gas downward through collision therewith. The stator blades 123 (123a, 123b, 123c . . . ) are made of a metal such as, for example, aluminum, iron, stainless steel, copper, or the like, or a metal such as an alloy containing any of these metals as a component.

The stator blades 123 are also formed inclined at a predetermined angle from the plane perpendicular to the axial line of the rotor shaft 113 in the same way, and are disposed extending toward the inner side of the outer cylinder 127, alternating with the stages of rotor blades 102. Outer circumferential ends of the stator blades 123 are supported in a state of being inserted between a plurality of stator blade spacers 125 (125a, 125b, 125c . . . ) that are stacked up.

The stator blade spacers 125 are ring-shaped members, and are made of a metal such as, for example, aluminum, iron, stainless steel, copper, or the like, or a metal such as an alloy containing any of these metals as a component. The outer cylinder 127 is fixed on outer perimeters of the stator blade spacers 125, with a slight gap therebetween. A base portion 129 is disposed at a bottom portion of the outer cylinder 127 (more specifically, a bottom portion of the outer wall 126). An outlet port 133 is formed above the base portion 129 so as to externally communicate. Exhaust gas that enters the inlet port 101 from a chamber (a vacuum chamber) side and is transported toward the base portion 129 is sent to the outlet port 133.

Further, depending on the use of the turbomolecular pump 100, a threaded spacer 131 is disposed between a bottom portion of the stator blade spacers 125 and the base portion 129. The threaded spacer 131 is a cylindrically shaped member made of aluminum, copper, stainless steel, or iron, or a metal such as an alloy containing any of these metals as a component, or the like, with a plurality of thread grooves 131a that is spiral-like and that is ditched in an inner circumferential face thereof. A direction of spiraling of the thread grooves 131a is a direction in which molecules of exhaust gas are transported toward the outlet port 133, when the molecules move in a rotational direction of the rotating body 103. A cylindrical portion 102d that extends downward continuing from the rotor blades 102 (102a, 102b, 102c . . . ) is provided at a bottommost portion of the rotating body 103. An outer circumferential face of this cylindrical portion 102d is cylindrically shaped and is enlarged toward the inner circumferential face of the threaded spacer 131, and is in close proximity with the inner circumferential face of the threaded spacer 131 across a predetermined gap. Exhaust gas transported to the thread grooves 131a by the rotor blades 102 and the stator blades 123 is sent to the base portion 129, being guided by the thread grooves 131a.

More specifically, the exhaust gas guided to the thread grooves 131a is fed to an annular space 135 formed above the base portion 129, circles the annular space 135, and is externally discharged via the outlet port 133. This annular space 135 is a space that is annular in form, and is defined by the cylindrical portion 102d of the rotating body 103 (rotor), the threaded spacer (stator portion) 131, a heater spacer 153, and the base portion 129.

Now, the heater spacer 153 is a cylindrically shaped member, and is integrally configured with the threaded spacer 131 in the present example. As a matter of course, the heater spacer 153 and the threaded spacer 131 may be configured separately. The heater spacer 153 is made of a metal such as, for example, aluminum, stainless steel, or the like. A heater 195 serving as heating means is inserted into the heater spacer 153, and the threaded spacer 131 is heated via the heater spacer 153 by the heater 195 generating heat. Exhaust gas flowing through the annular space 135 is also heated by the heater 195. This suppresses deposited matter from being produced due to the temperature of the exhaust gas becoming lower.

The base portion 129 is a disc-shaped member making up a base portion of the turbomolecular pump 100, and generally is made of a metal such as iron, aluminum, stainless steel, or the like. The base portion 129 serves to physically hold the turbomolecular pump 100, and also has functions of a thermal conduction path. Accordingly, a metal that has rigidity, and also has high thermal conductivity, such as iron, aluminum, copper, or the like, is preferably used for the base portion 129.

In this configuration, upon the rotor blades 102 being rotationally driven by the motor 121 along with the rotor shaft 113, exhaust gas is sucked through the inlet port 101 from the unshown chamber, by operations of the rotor blades 102 and the stator blades 123. The rotational velocity of the rotor blades 102 normally is 20,000 rpm to 90,000 rpm, and peripheral velocity at tip ends of the rotor blades 102 reaches 200 m/s to 400 m/s. Exhaust gas sucked through the inlet port 101 passes between the rotor blades 102 and the stator blades 123, and is transported to the base portion 129. At this time, the temperature of the rotor blades 102 rises due to frictional heat generated at the time of the exhaust gas coming into contact with the rotor blades 102, conduction of heat generated at the motor 121, and this heat is conveyed to the side of the stator blades 123 by radiance, conduction by gas molecules of the exhaust gas, and so forth.

The stator blade spacers 125 are joined with each other on an outer perimeter portion, and externally convey heat that the stator blades 123 receive from the rotor blades 102, friction heat generated at the time of the exhaust gas coming into contact with the stator blades 123, and so forth.

Note that description has been made above that the threaded spacer 131 is disposed on an outer perimeter of the cylindrical portion 102d of the rotating body 103, with the thread grooves 131a ditched in the inner circumferential face of the threaded spacer 131. However, there are reverse cases in which thread grooves are ditched in the outer circumferential face of the cylindrical portion 102d, and a spacer having a cylindrically shaped inner circumferential face is disposed therearound.

Also, depending on the use of the turbomolecular pump 100, there are cases in which a perimeter of an electrical component portion configured of the upper-side radial-direction electromagnets 104, the upper-side radial-direction sensors 107, the motor 121, the lower-side radial-direction electromagnets 105, the lower-side radial-direction sensors 108, the axial-direction electromagnets 106A and 106B, the axial-direction sensor 109, and so forth, is covered by a stator column 122, so that gas suctioned through the inlet port 101 does not intrude into the electrical component portion, and inside of this stator column 122 is maintained at a predetermined pressure by a purge gas.

In this case, unshown piping is disposed in the base portion 129, and the purge gas is introduced through this piping. The introduced purge gas is sent out to the outlet port 133 through gaps between a protective bearing 120 and the rotor shaft 113, between a rotor and a stator of the motor 121, and between the stator column 122 and inner-circumferential-side cylindrical portions of the rotor blades 102. Note that the stator column 122 is erected at a center portion of the base portion 129, as illustrated in FIG. 1. Also, a coolant pipe 149 is provided to the base portion 129 in the present example, as cooling means. Supplying coolant water to the coolant pipe 149 maintains the base portion 129 and the stator column 122 at a suitable temperature.

Now, the turbomolecular pump 100 may have control based on identification of model, and individually-adjusted unique parameters (e.g., various characteristics corresponding to the model). The turbomolecular pump 100 is provided with an electronic circuit portion 141 within a main unit thereof, in order to store these control parameters. The electronic circuit portion 141 is configured of electronic parts such as semiconductor memory like electrically erasable programmable read-only memory (EEPROM), semiconductor devices for access thereto and so forth, a substrate 143 on which these are mounted, and so forth. The electronic circuit portion 141 is accommodated below an unshown rotational velocity sensor near a middle, for example, of the base portion 129 that makes up a lower portion of the turbomolecular pump 100, and is closed off by a bottom cover 145 that is airtight.

Now, there are some process gasses introduced into the chamber during manufacturing processes of semiconductors that have a nature of solidifying when a pressure thereof becomes higher than a predetermined value or a temperature thereof becoming lower than a predetermined value. Inside of the turbomolecular pump 100, the pressure of exhaust gas is lowest at the inlet port 101 and highest at the outlet port 133. When the pressure of the process gas becomes higher than the predetermined value, or the temperature thereof becoming lower than the predetermined value, while being transported from the inlet port 101 to the outlet port 133, the process gas solidifies, and adheres to the inside of the turbomolecular pump 100 and thus is deposited.

For example, in a case of using tetrachlorosilane (SiCl4) as a process gas in an aluminum etching device, it can be understood from a vapor gas curve that precipitation of a solid product (e.g., aluminum chloride (AlCl3)) will occur under low vacuum (760 torr to 10-2 torr) and low temperature (approximately 20° C.), and become adhered to and deposited on the inside of the turbomolecular pump 100. Accordingly, when deposition of a precipitate of a process gas on the inside of the turbomolecular pump 100 occurs, the deposited matter narrows pump channels, causing deterioration in performance of the turbomolecular pump 100. The aforementioned product tends to solidify and adhere at portions where pressure is high, such as around the outlet port 133 and around the threaded spacer 131.

Accordingly, in order to solve this problem, an arrangement is conventionally made in which an unshown heater, and a coolant pipe 149 that is annular in shape, are wound onto an outer perimeter of the base portion 129 or the like, and also an unshown temperature sensor (e.g., a thermistor) is embedded in the base portion 129, for example. Control of heating by the heater and cooling by the coolant pipe 149 so as to maintain the temperature of the base portion 129 at a constant high temperature (set temperature) on the basis of signals from this temperature sensor is performed (hereinafter referred to as "temperature management system" (TMS)).

Next, the amplifier circuit 150 that performs excitation control of the upper-side radial-direction electromagnets 104, the lower-side radial-direction electromagnets 105, and the axial-direction electromagnets 106A and 106B, will be described with regard to the turbomolecular pump 100 configured thus. A circuit diagram of this amplifier circuit 150 is shown in FIG. 2.

Figure 2:
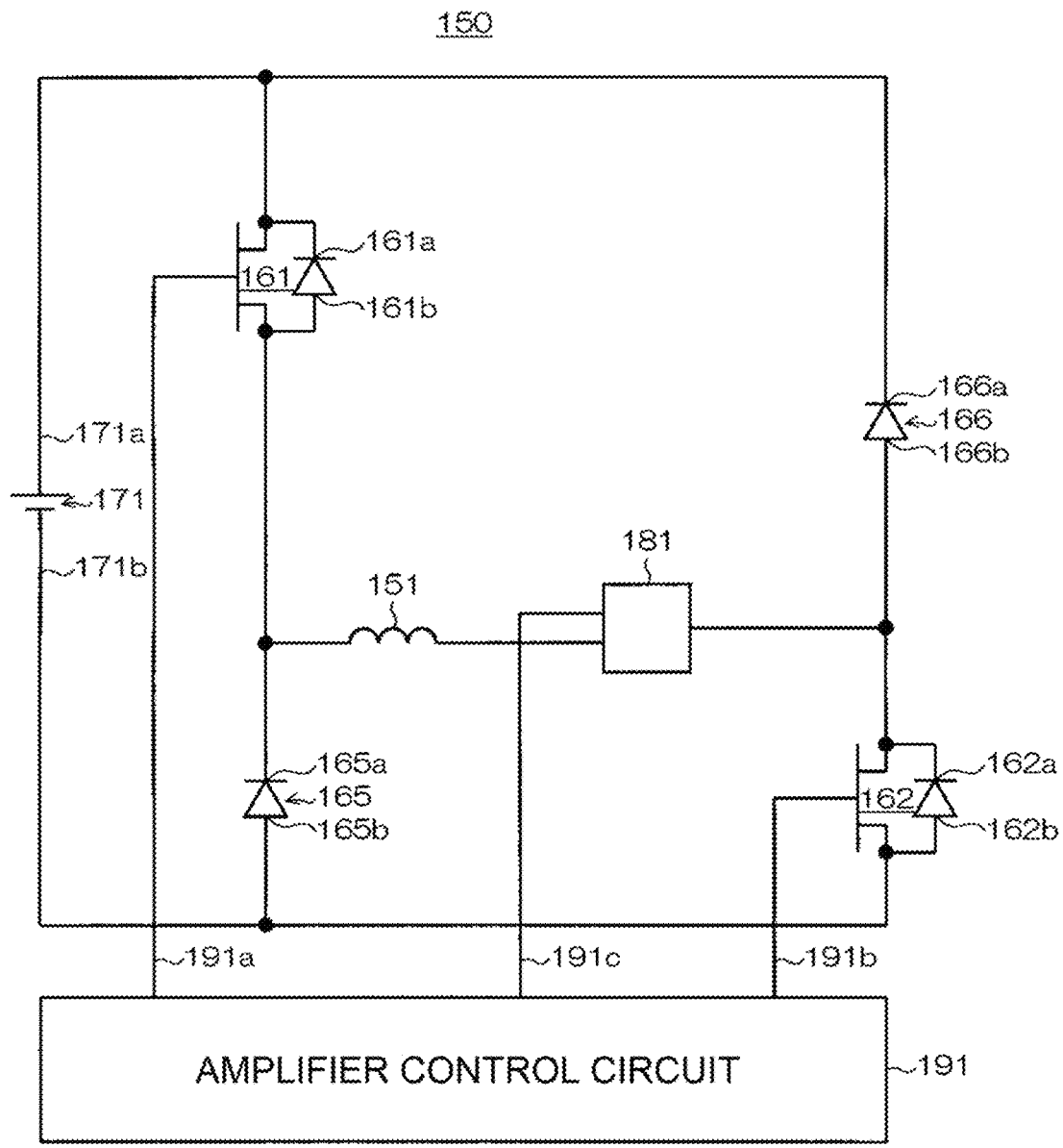
FIG. 2 is a circuit diagram of an amplifier circuit of the turbomolecular pump illustrated in FIG. 1.

In FIG. 2, one end of an electromagnet winding 151 that makes up the upper-side radial-direction electromagnets 104 or the like is connected to a positive terminal 171a of an electric power source 171 via a transistor 161, and another end thereof is connected to a negative terminal 171b of the electric power source 171 via an electric current detecting circuit 181 and a transistor 162. The transistors 161 and 162 are so-called power metal-oxide-semiconductor field-effect transistors (MOSFETs), having a structure in which a diode is connected between a source and a drain thereof.

At this time, the transistor 161 is arranged such that a cathode terminal 161a of the diode thereof is connected to the positive terminal 171a, and an anode terminal 161b is connected to one end of the electromagnet winding 151. Also, the transistor 162 is arranged such that a cathode terminal 162a of the diode thereof is connected to the electric current detecting circuit 181, and an anode terminal 162b is connected to the negative terminal 171b.

At the same time, a cathode terminal 165a of a current-regenerative diode 165 is connected to one end of the electromagnet winding 151, and an anode terminal 165b thereof is connected to the negative terminal 171b. In the same way, a cathode terminal 166a of a current-regenerative diode 166 is connected to the positive terminal 171a, and an anode terminal 166b thereof is connected to the other end of the electromagnet winding 151 via the electric current detecting circuit 181. The electric current detecting circuit 181 is made up of, for example, a Hall sensor type current sensor, an electrical resistance component, or the like.

The amplifier circuit 150 configured as described above corresponds to a single electromagnet. Accordingly, in a case in which the magnetic bearing is a five-axis control magnetic bearing, and there is a total of ten electromagnets 104, 105, 106A, and 106B, the amplifier circuits 150 are configured in the same way for each of the electromagnets, and there will be ten amplifier circuits 150 that are connected in parallel with respect to the electric power source 171.

Further, an amplifier control circuit 191 is made up of an unshown digital signal processor unit (hereinafter referred to as "DSP unit") of the control device 200, for example, and this amplifier control circuit 191 is arranged to switch on/off of the transistors 161 and 162.

The amplifier control circuit 191 is arranged to compare an electric current value detected by the electric current detecting circuit 181 (a signal in which this electric current value is reflected will be referred to as "electric current detection signal 191c") with a predetermined electric current instruction value. The amplifier control circuit 191 is arranged to decide a magnitude of a pulse width (pulse width time Tp1, Tp2) to be generated in a control cycle Ts, which is one cycle under pulse-width modulation (PWM) control, on the basis of a result of this comparison. Consequently, gate drive signals 191a and 191b that have these pulse widths are output from the amplifier control circuit 191 to gate terminals of the transistors 161 and 162.

Note that at the time of passing a resonance point during acceleration operation of rotational velocity of the rotating body 103, at the time of disturbance occurring during constant speed operation, or the like, there is a need to perform positional control of the rotating body 103 at high speed and with a strong force. Accordingly, a high voltage around 50 V, for example, is used for the electric power source 171, so that sudden increase (or decrease) of electric current flowing through the electromagnet winding 151 can be performed. Also, a capacitor (omitted from illustration) is usually connected between the positive terminal 171a and the negative terminal 171b of the electric power source 171, for stability of the electric power source 171.

In this configuration, when both of the transistors 161 and 162 are turned on, electric current flowing to the electromagnet winding 151 (hereinafter referred to as "electromagnet current iL") increases, and when both are turned off, the electromagnet current iL decreases.

Also, when one of the transistors 161 and 162 is turned on and the other is turned off, so-called flywheel current is maintained. Applying flywheel current to the amplifier circuit 150 in this way enables hysteresis loss at the amplifier circuit 150 to be reduced, and electric power consumption can be kept low for the overall circuit. Also, controlling the transistors 161 and 162 in this way enables high-frequency noise such as harmonics generated in the turbomolecular pump 100 to be reduced. Further, measuring the flywheel current at the electric current detecting circuit 181 enables detection of the electromagnet current iL flowing at the electromagnet winding 151.

Figure 3:
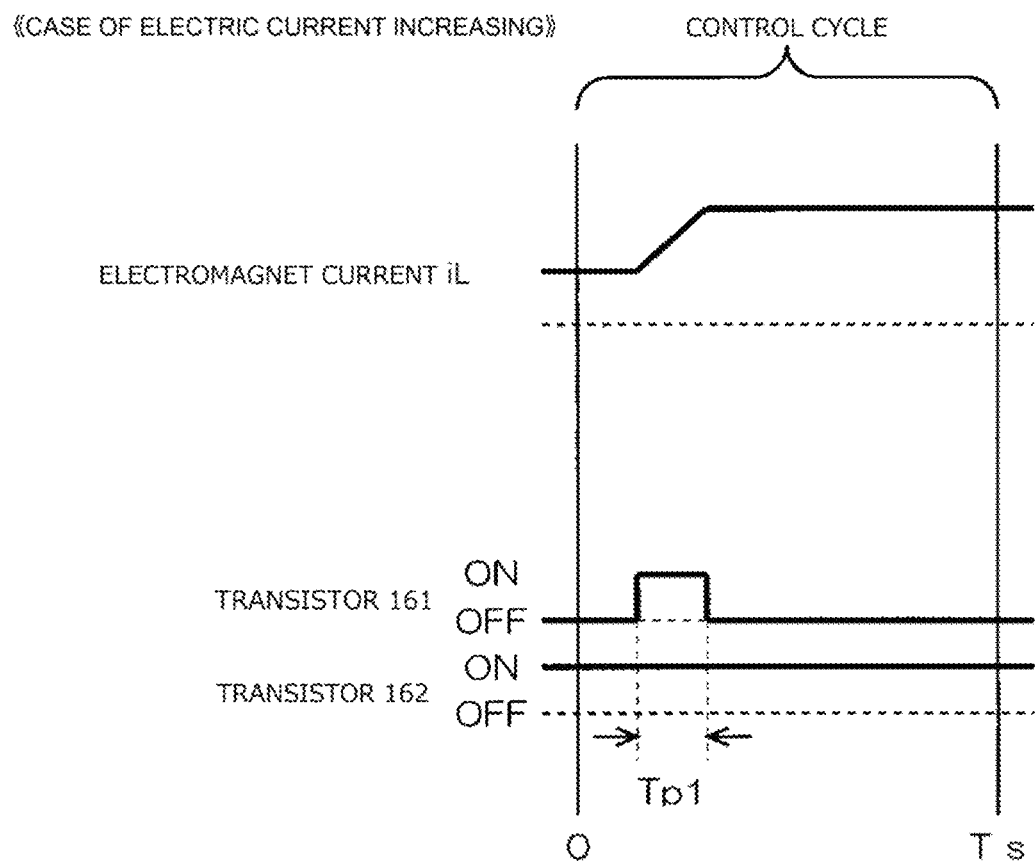
FIG. 3 is a timing chart showing control of an amplifier control circuit in a case in which an electric current instruction value is greater than a detected value.

That is to say, in a case in which a detected current value is smaller than the electric current instruction value, both of the transistors 161 and 162 are turned on for an amount of time equivalent to the pulse width time Tp1, just once in the control cycle Ts (e.g., 100 µs), as shown in FIG. 3. Accordingly, the electromagnet current iL during this period increases toward an electric current value iLmax (omitted from illustration) that can be made to flow from the positive terminal 171a to the negative terminal 171b via the transistors 161 and 162.

Figure 4:
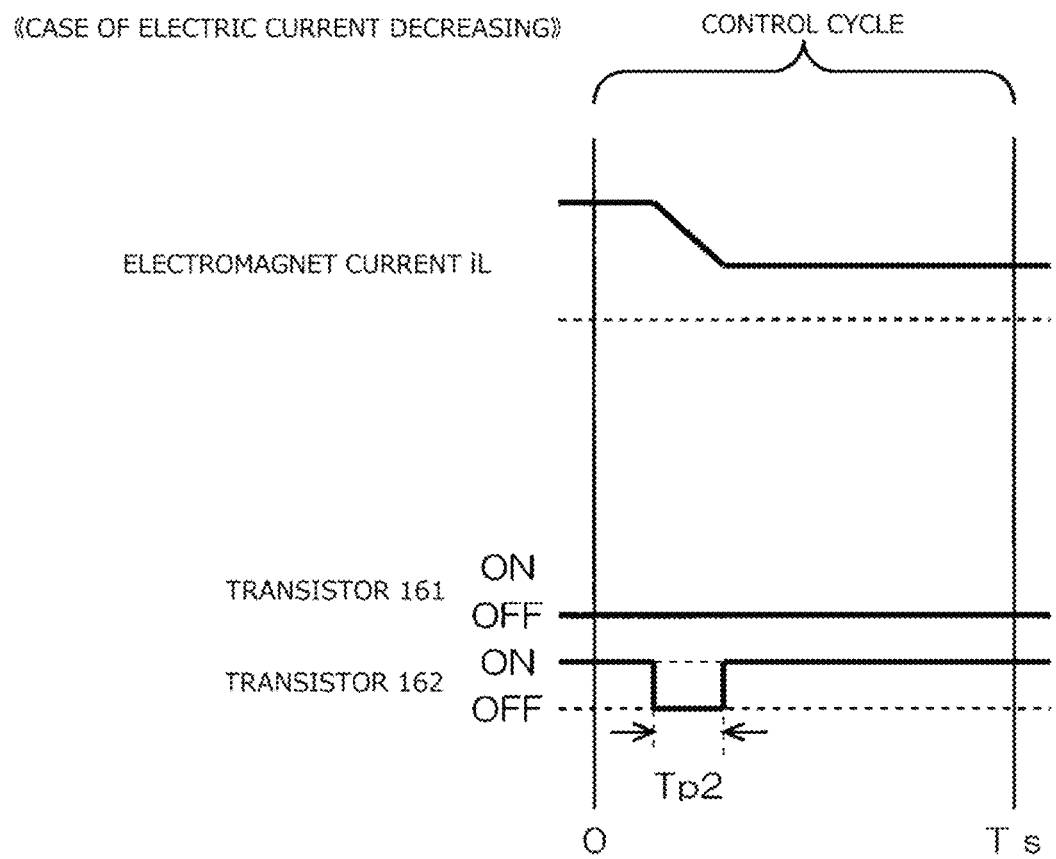
FIG. 4 is a timing chart showing control of the amplifier control circuit in a case in which the electric current instruction value is smaller than a detected value.

Conversely, in a case in which a detected current value is greater than the electric current instruction value, both of the transistors 161 and 162 are turned off for an amount of time equivalent to the pulse width time Tp2, just once in the control cycle Ts, as shown in FIG. 4. Accordingly, the electromagnet current iL during this period decreases toward an electric current value iLmin (omitted from illustration) that can be regenerated from the negative terminal 171b to the positive terminal 171a via the diodes 165 and 166.

In either case, one of the transistors 161 and 162 is then turned on after the pulse width time Tp1 or Tp2 elapses. Accordingly, during this period, the flywheel current is maintained at the amplifier circuit 150.

Next, a feature portion of the turbomolecular pump 100 according to the present example will be described in detail. In the present example, the outer cylinder 127, the water cooling spacer 128, and the outer wall 126 are fixed by the plurality of bolts 115 and 116, the method of fixing differing between first bolts 115 and second bolts 116. Note that the first bolts 115 and the second bolts 116 are the same.

Figure 5:
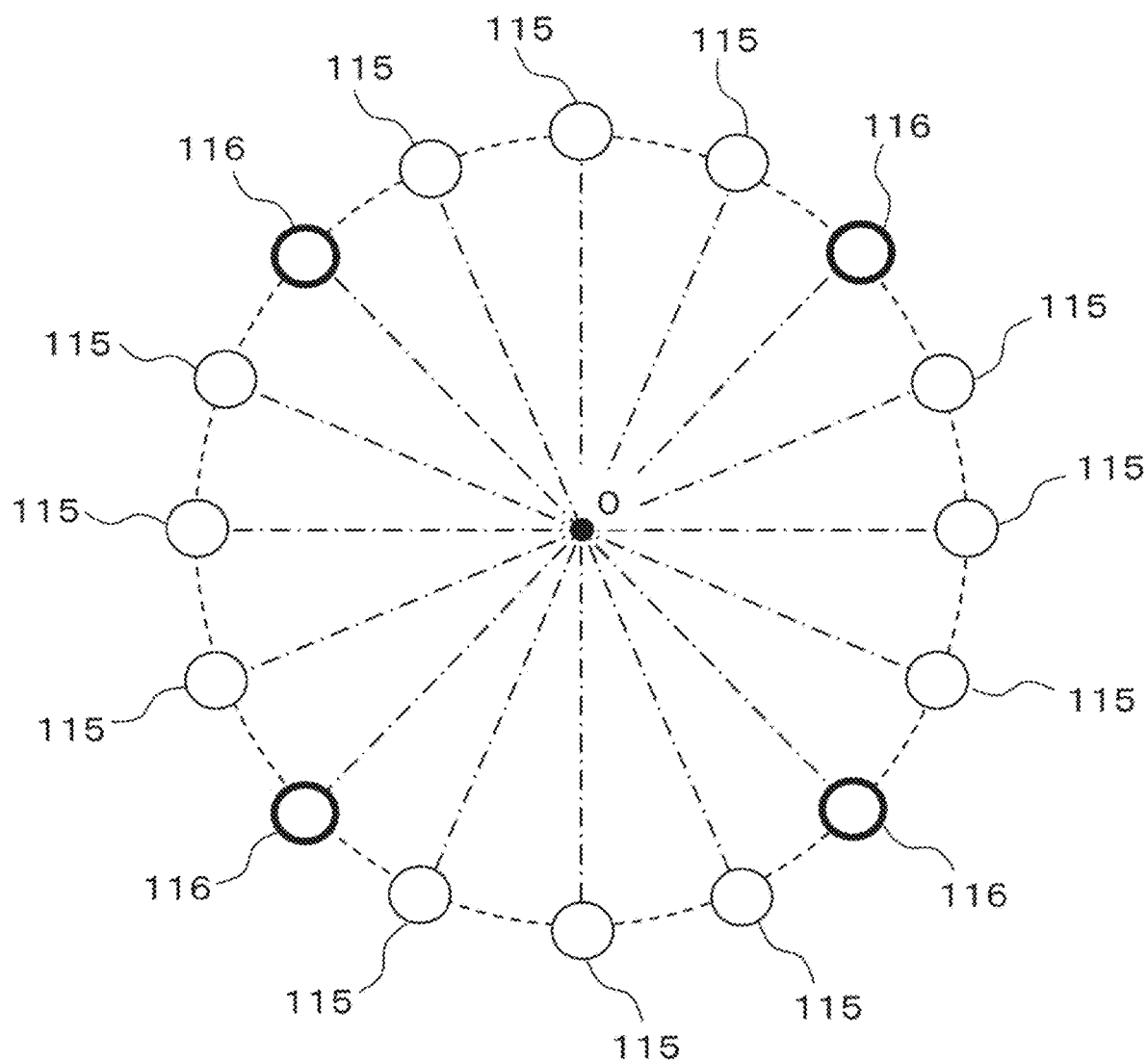
FIG. 5 is a diagram schematically illustrating positions of first bolts and second bolts as viewed from above the turbomolecular pump.

FIG. 5 is a diagram schematically illustrating positions of the first bolts 115 and the second bolts 116 as viewed from above the turbomolecular pump 100. The first bolts 115 and the second bolts 116 are disposed equidistantly on a concentric circle as a center O of the outer cylinder 127, as illustrated in FIG. 5, but do not have to be disposed equidistantly, and the first bolts 115 and the second bolts 116 do not have to be disposed on a concentric circle. Also, the count of the first bolts 115 is 12 and the count of the second bolts 116 is four in the present example, with the count of the second bolts 116 being smaller or less than the count of the first bolts 115. As a matter of course, the count of the second bolts 116 may be greater than the count of the first bolts 115, and the count of both may be the same. A suitable count of bolts can be selected taking into consideration an axial force to fasten the outer cylinder 127, the water cooling spacer 128, and the outer wall 126 by bolting, and destructive torque that the turbomolecular pump 100 is subjected to at the time of the rotating body 103 failing. In FIG. 5, the first bolts 115 are tightened by a normal technique, and the second bolts 116 are tightened via later-described axial force reducing means (spacers 117).

Figure 6:
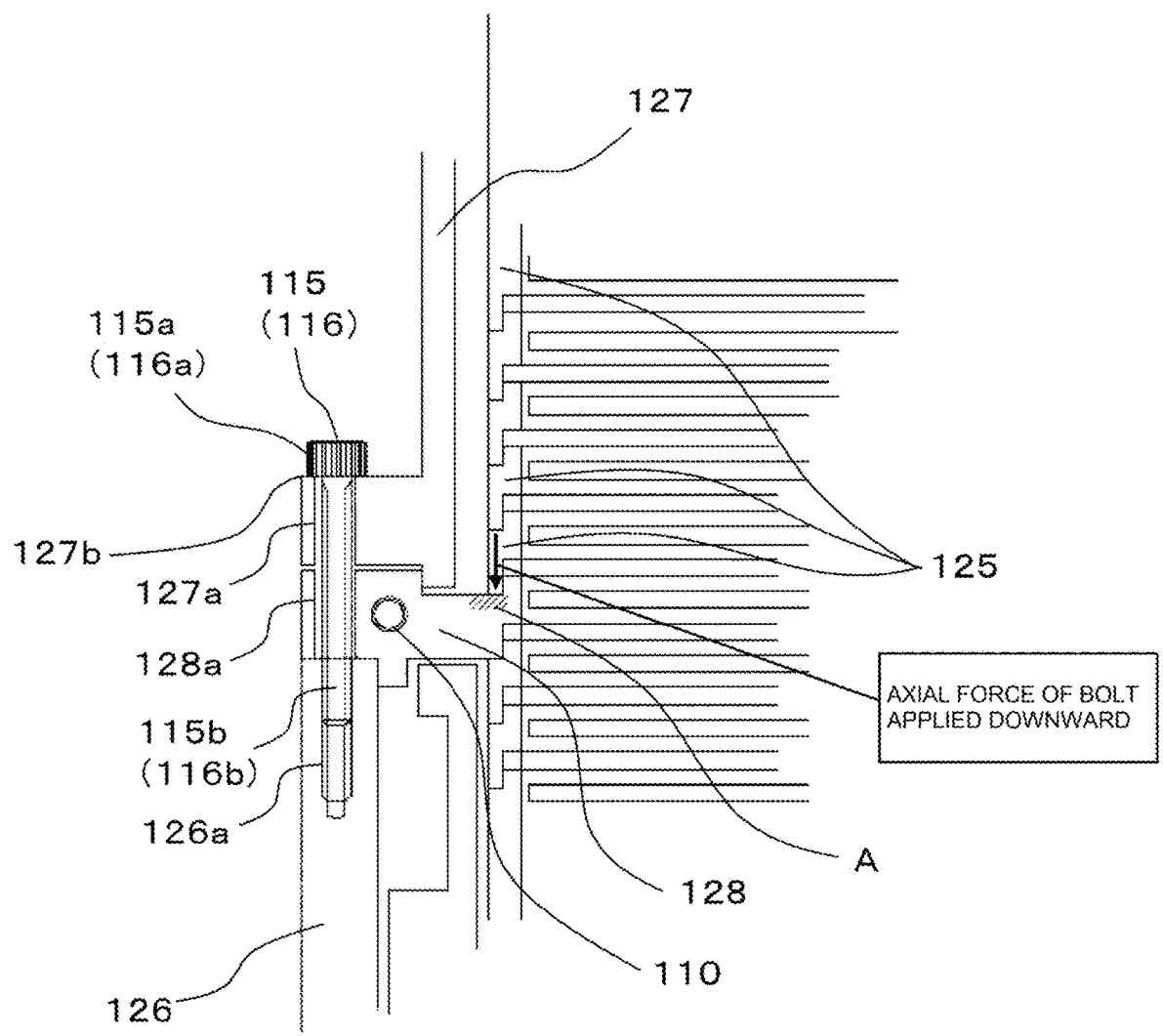
FIG. 6 is an enlarged view of primary portions of a fastening portion of a first bolt.
Figure 7:
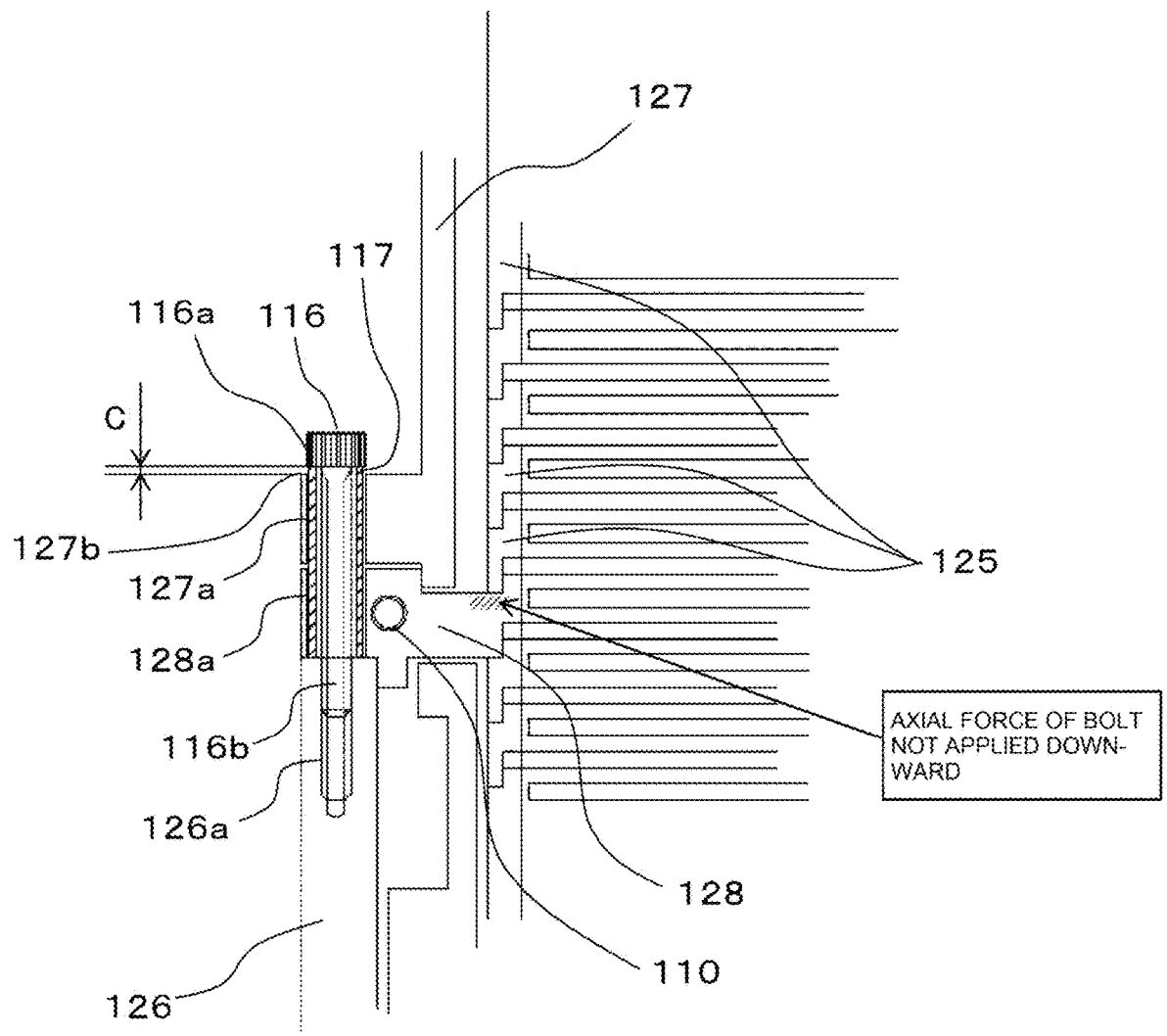
FIG. 7 is an enlarged view of primary portions of a fastening portion of a second bolt.

FIG. 6 is an enlarged view of primary portions of a fastening portion of the first bolt 115, and FIG. 7 is an enlarged view of primary portions of a fastening portion of the second bolt 116. As illustrated in FIGS. 6 and 7, through holes 127a through which the first bolts 115 and the second bolts 116 pass are provided in the outer cylinder 127. In the same way, through holes 128a are provided in the water cooling spacer 128. Also, screw holes 126a, to which screw portions 115b of the first bolts 115 and screw portions 116b of the second bolts 116 are screwed, are provided in the outer wall 126. By inserting the bolts 115 and 116 into the screw holes 126a through the through holes 127a and 128a, and tightened at a predetermined torque, the outer cylinder 127, the water cooling spacer 128, and the outer wall 126 are integrally fixed. Note that the through holes 127a and 128a through which the second bolts 116 pass are formed with a greater diameter than a diameter of the through holes 127a and 128a through which the first bolts 115 pass, due to the later-described spacers 117 being inserted therein.

As illustrated in FIG. 6, the first bolt 115 is inserted into the screw hole 126a via the through holes 127a and 128a, and is tightened by the same technique as conventionally used. Accordingly, a head portion 115a of the first bolt 115 comes into contact with a bolt fastening face 127b, and the axial force of the first bolt 115 acts on the outer cylinder 127 and the water cooling spacer 128.

Conversely, the second bolt 116 is arranged to be tightened via the spacer 117, as illustrated in FIG. 7. A configuration of the spacer 117 serving as the axial force reducing means will be described in detail below.

The spacer 117 is a member that is tubularly formed and made of metal, and is inserted in the through hole 127a of the outer cylinder 127 and the through hole 128a of the water cooling spacer 128, as illustrated in FIG. 7. Note that while the spacer 117 may be made of a material other than metal, metal is more preferable since deformation of the spacer 117 due to change over time following fastening of the bolt, which can lead to loosening of bolt fastening, does not readily occur. The spacer 117 has an outer diameter such that the spacer 117 is smoothly removably insertable into the through holes 127a and 128a and has an internal diameter such that the screw portion 116b of the second bolt 116 is precisely removably insertable therein. The spacer 117 is formed having a dimension that is slightly longer than a total of a length of the through hole 127a and a length of the through hole 128a. Accordingly, when inserted into the through holes 127a and 128a, the spacer 117 is in a state of slightly protruding from a surface (bolt fastening face 127b) of the outer cylinder 127, as illustrated in FIG. 7.

When the second bolt 116 is inserted into the screw hole 126a via the spacer 117 and tightened at the predetermined torque, the length of the spacer 117 impedes so that a head portion 116a of the second bolt 116 cannot come into contact with the bolt fastening face 127b. Accordingly, a gap C is formed between the head portion 116a of the second bolt 116, and the bolt fastening face 127b that is the portion of the surface of the outer cylinder 127 that faces the head portion 116a. Accordingly, the axial force of the second bolt 116 acts only on the outer wall 126, and does not act on the outer cylinder 127 and the water cooling spacer 128. That is to say, the spacer 117 reduces (prevents) the axial force of the second bolt 116 from acting on the outer cylinder 127 and the water cooling spacer 128.

Advantages of the present example configured in this way will be described next.

When the weight of the rotating body 103 increases due to specification changes or the like, for example, the destructive torque increases, as a matter of course. The increase in destructive torque can be absorbed by using bolts, increasing the PCD of the bolts, or the like. However, if employing such measures is undesirable, the count of the bolts 115 and 116 has to be increased to absorb the increase in destructive torque.

In doing so, tightening not only the first bolts 115 but the second bolts 116 as well using the conventional technique illustrated in FIG. 6 may cause deformation of the water cooling spacer 128, due to excessive axial force being applied to the outer cylinder 127 and the water cooling spacer 128.

To describe in further detail, when the second bolts 116 are tightened by the conventional technique illustrated in FIG. 6, axial force of the second bolts 116 acts on the outer cylinder 127 and the water cooling spacer 128. Accordingly, an outer perimeter side portion of the water cooling spacer 128 is tightened and fixed by the second bolts 116. That is to say, the outer perimeter side portion of the water cooling spacer 128 becomes a fixed end.

The axial force of the second bolt 116 also acts on the outer cylinder 127, and accordingly the outer cylinder 127 is subjected to downward axial force illustrated in FIG. 6. Accordingly, a flange portion 127f (see FIG. 1) at an upper end of the outer cylinder 127 is also subjected to downward axial force. The flange portion 127f of the outer cylinder 127 and the stator blade spacer 125a at an uppermost tier are in contact, and the stator blade spacers 125 (125a, 125b, 125c . . . ) of each tier are also each in contact. Accordingly, when the axial force of the second bolts 116 is applied to the outer cylinder 127, the axial force is conveyed to the stator blade spacers 125. That is to say, the flange portion 127f of the outer cylinder 127 presses the stator blade spacers 125 downward under the axial force of the second bolts 116. The stator blade spacers 125 and the water cooling spacer 128 are in contact in the axial direction, and accordingly axial force applied to the outer cylinder 127 acts on an inner circumferential side portion of the water cooling spacer 128 (portion indicated by hatching A in FIG. 6) via the stator blade spacers 125, as illustrated in FIG. 6.

That is to say, the outer perimeter side portion of the water cooling spacer 128 becomes a fixed end, the inner circumferential side becomes a free end, and the axial force of the second bolts 116 acts downward on this free end side. Accordingly, bending moment acts on the water cooling spacer 128 with the fixed end serving as a fulcrum, and the portion on the inner circumferential side is deformed (bent) downwards. Thus, there is a concern that simply increasing the count of bolts to absorb the increase in destructive torque will lead to deformation of the water cooling spacer 128, and accordingly is not preferable.

Conversely, according to the present example, the second bolts 116 fasten the outer cylinder 127, the water cooling spacer 128, and the outer wall 126 via the spacers 117, as illustrated in FIG. 7, and accordingly the axial force of the second bolts 116 does not act on the water cooling spacer 128. That is to say, downward force is not applied to the hatched portion in FIG. 7. Thus, according to the present example, even when the weight of the rotating body 103 increases due to specification changes or the like of the turbomolecular pump 100, and the destructive torque increases, the increase in destructive torque can be absorbed by increasing the count of bolts, while preventing deformation of the water cooling spacer 128.

That is to say, the present example is capable of securing fastening of the outer cylinder 127, the water cooling spacer 128, and the outer wall 126 in the axial direction by the axial force of the first bolts 115, and can absorb the destructive torque by the first bolts 115 and the second bolts 116 while preventing deformation of the water cooling spacer 128.

Thus, according to the present example, even in a case in which there is demand for specification changes due to increased size of the turbomolecular pump 100 and higher temperatures, this can be handled simply by design change in which the count of bolts 115 and 116 is increased, using highly versatile bolts, and accordingly low costs can be realized. Also, the PCD of the bolts does not need to be increased, which is also favorable in that the size of the turbomolecular pump 100 (an outer diameter thereof, in particular) does not have to be increased.

Figure 8:
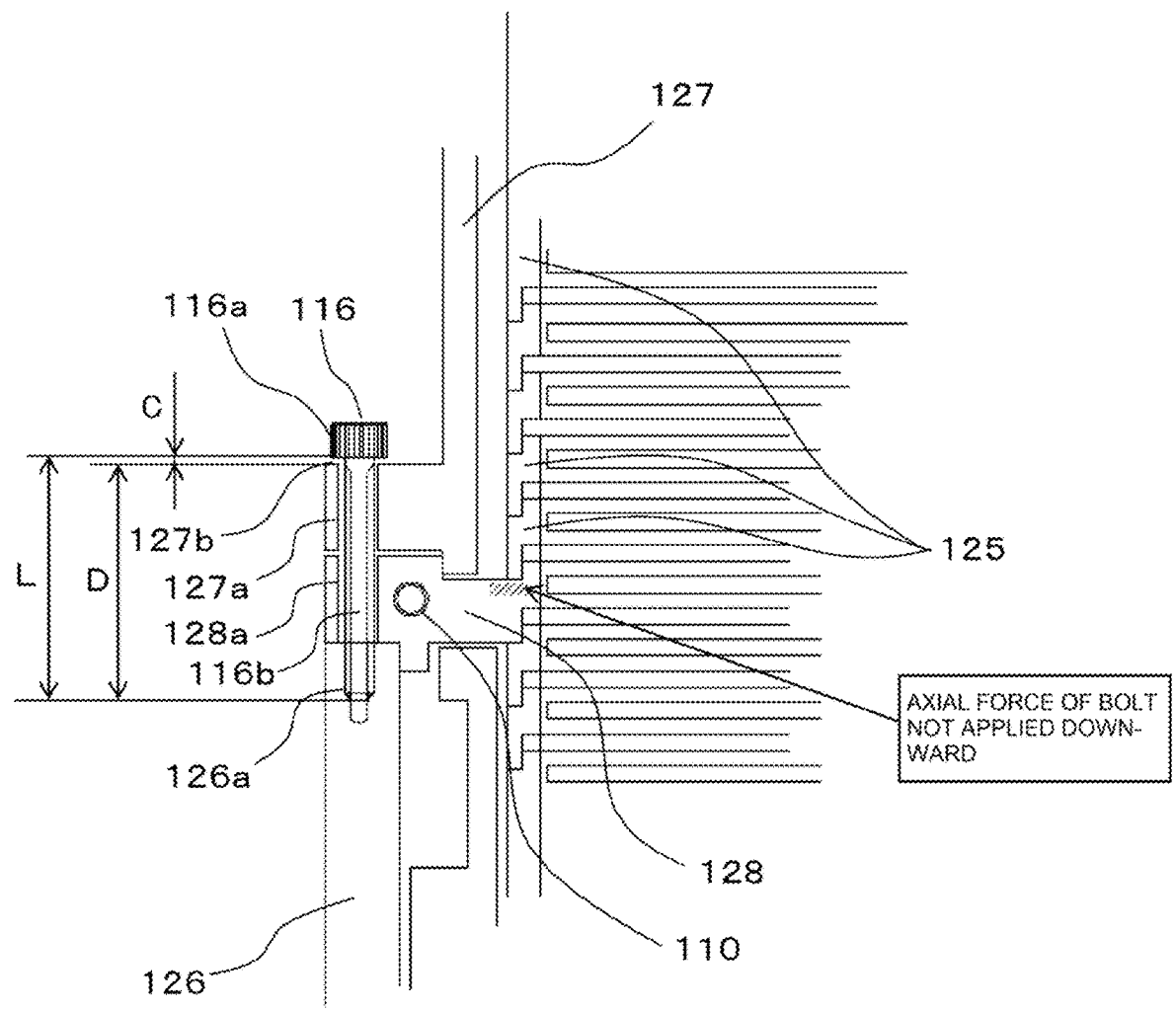
FIG. 8 is an enlarged view of primary portions of a fastening portion of a second bolt according to Modification 1.

Next, Modification 1 of the axial force reducing means will be described. A feature of the axial force reducing means according to Modification 1 is a configuration in which a nominal length L of the second bolt 116 is made longer, so that the gap C is formed between the head portion 116a of the second bolt 116 and the bolt fastening face 127b of the outer cylinder 127. This will be described in detail with reference to FIG. 8. FIG. 8 is an enlarged view of primary portions of the fastening portion of the second bolt 116 according to Modification 1.

In Modification 1, the nominal length L of the second bolt 116 is greater than a total value D of the length of the through hole 127a of the outer cylinder 127, the length of the through hole 128a of the water cooling spacer 128, and the screwing depth of the screw hole 126a of the outer wall 126, as illustrated in FIG. 8. Accordingly, when tightening the second bolt 116, a tip end of the screw portion 116b of the second bolt 116 abuts a bottom portion of the screw hole 126a before the head portion 116a of the second bolt 116 comes into contact with the bolt fastening face 127b of the outer cylinder 127. As a result, the gap C is formed between the head portion 116a of the second bolt 116 and the bolt fastening face 127b.

Also, a similar structure can be made by making the screwing depth of the screw hole 126a for the second bolt 116 to be shorter than the screwing depth of the screw hole 126a for the first bolt 115.

According to the configuration of this Modification 1, the axial force of the second bolt 116 does not act on the outer cylinder 127 and the water cooling spacer 128, due to the gap C being formed. That is to say, in Modification 1, the second bolt 116 itself functions as the axial force reducing means. Accordingly, the same effects and advantages as the above-described example are exhibited. That is to say, deformation of the water cooling spacer 128 can be prevented. Also, the spacer 117 may not be included, thereby contributing to reduction in parts count.

Figure 9:
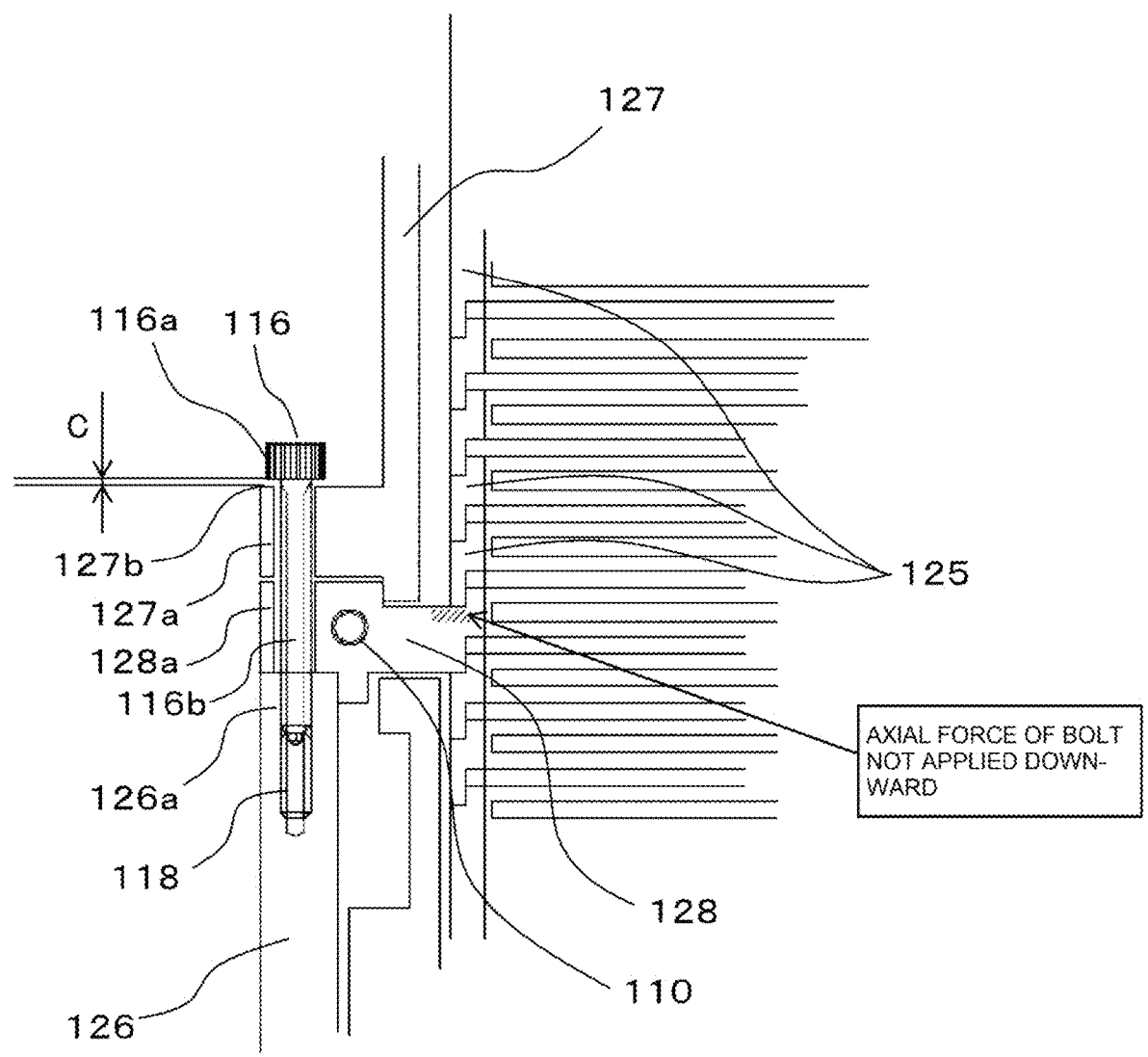
FIG. 9 is an enlarged view of primary portions of a fastening portion of a second bolt according to Modification 2.

Next, Modification 2 of the axial force reducing means will be described. A feature of Modification 2 is a point of using a stopper 118 as the axial force reducing means instead of the spacer 117. This will be described in detail with reference to FIG. 9. FIG. 9 is an enlarged view of primary portions of the fastening portion of the second bolt 116 according to Modification 2.

As illustrated in FIG. 9, the stopper 118 that is made of metal is embedded being screwed into the bottom portion of the screw hole 126a. Note that while the stopper 118 may be made of a material other than metal, metal is more preferable since deformation of the stopper 118 due to change over time following fastening of the bolt, which can lead to loosening of bolt fastening, does not readily occur. Due to this stopper 118, the gap C is formed between the head portion 116a of the second bolt 116 and the bolt fastening face 127b of the outer cylinder 127 at the time of the tip end portion of the screw portion 116b of the second bolt 116 coming into contact with the stopper 118.

According to this Modification 2, the gap C is formed by the stopper 118, and thus the axial force of the second bolt 116 does not act on the outer cylinder 127 and the water cooling spacer 128. Thus, the same effects and advantages as the above-described example are exhibited. That is to say, deformation of the water cooling spacer 128 can be prevented.

Figure 10:
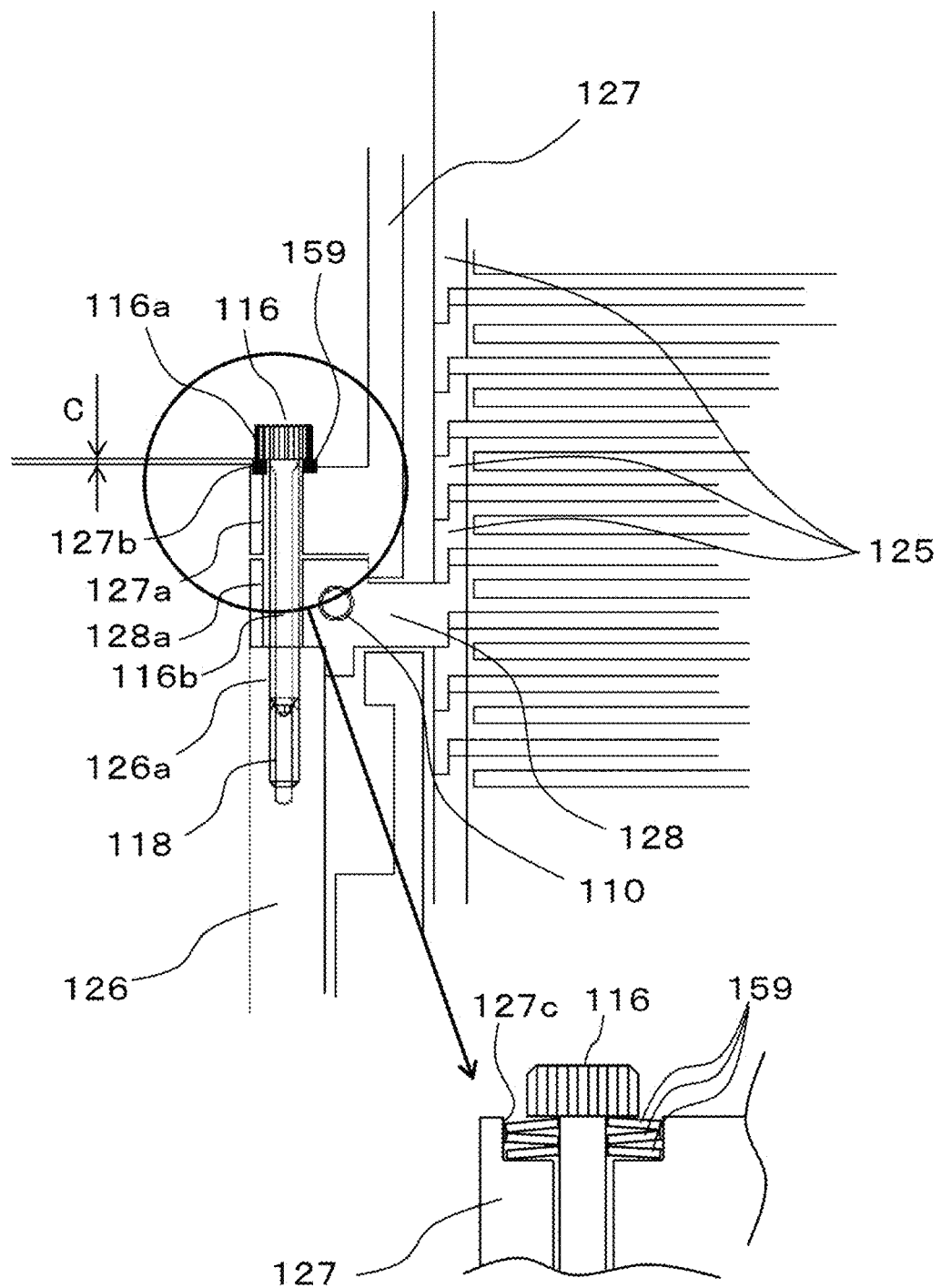
FIG. 10 is an enlarged view of primary portions of a fastening portion of a second bolt according to Modification 3.

Next, Modification 3 of the axial force reducing means will be described. A feature of Modification 3 is a point of disposing a plurality of spring washers 159 in the gap C, in addition to using the stopper 118 as the axial force reducing means. This will be described in detail with reference to FIG. 10. FIG. 10 is an enlarged view of primary portions of the fastening portion of the second bolt 116 according to Modification 3.

As illustrated in FIG. 10, in Modification 3, spring washers 159, which are elastic members, are disposed in the gap C. Specifically, a recessed portion 127c is formed in the outer cylinder 127, and three spring washers 159 are disposed in the recessed portion 127c on top of each other. Accordingly, the recessed portion 127c is a space for accommodating the spring washers 159.

According to this Modification 3, the spring washers 159 can absorb thermal expansions, which is effective in preventing loosening of the second bolt 116. Note that a configuration may be made in which a foamed material, urethane rubber, or the like, is provided in the recessed portion 127c as the elastic member, instead of the spring washers 159. As a matter of course, the elastic member such as the spring washers 159 and so forth can be applied to all examples and modifications disclosed in the present specification.

Figure 11:
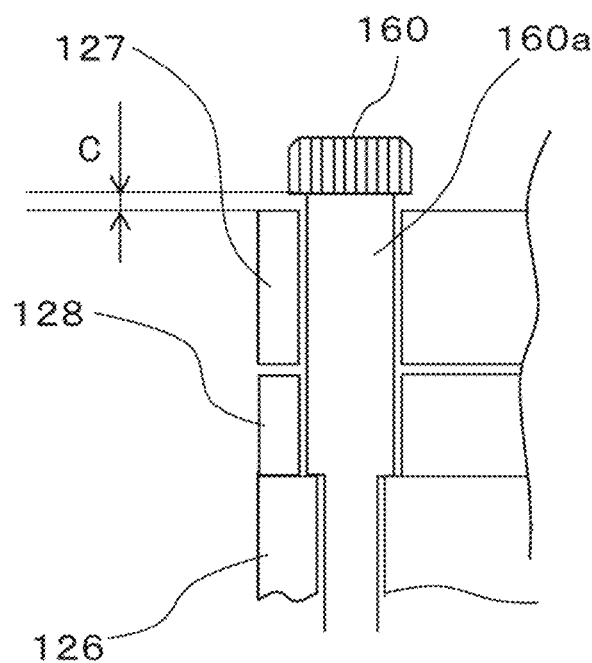
FIG. 11 is a diagram schematically illustrating a fastening portion of a second bolt according to Modification 4.

Next, Modification 4 of the axial force reducing means will be described. A feature of Modification 4 is a point of using a stepped bolt 160 as the second bolt, as illustrated in FIG. 11. A cylindrical portion (stepped portion) 160a of the stepped bolt 160 comes into contact with the outer wall 126, and accordingly has the same function as the spacer 117. That is to say, in Modification 4, the axial force reducing means are made up of the stepped bolt 160 in which the second bolt 116 and the spacer 117 are integrated, instead of the configuration of the second bolt 116 and the spacer 117, such that axial force does not act on the outer cylinder 127. Accordingly, the same effects and advantages as the present example are exhibited by this Modification 4 as well. Also reduction in part count can be anticipated, since the spacer 117 is not included. A further advantage is improved efficiency of work, since assembly is easy.

It should be noted that the present disclosure is not limited to the above-described example, various modifications can be made without departing from the spirit and scope of the present disclosure, and all technical matters encompassed by the technological concept described in the Claims are an object of the present disclosure. Although the example shows a preferred example, one skilled in the art will be able to realize various substitutions, alterations, modifications, combinations, and improvements, from the content disclosed in the present specifications, and these are encompassed by the technical scope described in the attached Claims.

The present disclosure is applicable to any vacuum pump, such as for example, a turbomolecular pump in which the water cooling spacer 128 and the outer wall 126 are integrated and make up a peripheral part, a turbomolecular pump of a configuration in which there is no water cooling spacer 128 with the outer cylinder 127 and the outer wall 126 being directly fastened, and so forth. That is to say, the present disclosure is applicable to portions where applying excessive axial force by bolts to a peripheral part is undesirable in a vacuum pump having a configuration in which an outer cylinder and a peripheral part are fastened by bolts.

The invention claimed is:

1. A vacuum pump, comprising:
a rotating body;
an outer cylinder that accommodates the rotating body;
a first peripheral part that is disposed on an outer perimeter side of the rotating body and concentrically with the outer cylinder;
a second peripheral part that is disposed between the outer cylinder and the first peripheral part in an axial direction;
a plurality of bolts that fasten the outer cylinder, the first peripheral part and the second peripheral part; and
an axial force reducing means for reducing bolt axial force acting on the outer cylinder, wherein:
the axial force reducing means is provided to a bolt of the plurality of bolts,
the axial force reducing means has a structure that forms a gap between a head portion of the bolt and a bolt fastening face that is an outer face of the outer cylinder and that faces the head portion of the bolt, and
the gap is provided so that the axial force of the bolt does not act on the outer cylinder and the second peripheral part.

2. The vacuum pump according to claim 1, wherein:
a plurality of through holes, through which the plurality of bolts are passed, are provided in the outer cylinder,
a plurality of screw holes into which the plurality of bolts are screwed are provided in the first peripheral part,
a spacer serving as the axial force reducing means is inserted into at least one of the plurality of through holes, and
the gap is formed between the head portion of the bolt and the bolt fastening face across the spacer.

3. The vacuum pump according to claim 1, wherein:
a plurality of through holes, through which the plurality of bolts are passed, are provided in the outer cylinder,
a plurality of through holes, through which the plurality of bolts are passed, are provided in the second peripheral part,
a plurality of screw holes, into which the plurality of bolts are screwed, are provided in the first peripheral part, and
the gap is formed between the head portion of the bolt and the bolt fastening face by at least one of the plurality of bolts functioning as the axial force reducing means by being formed to have a nominal length that is greater than a total value of a length of the through hole and a screwing depth of the screw hole.

4. The vacuum pump according to claim 1, wherein:
a plurality of through holes, through which the plurality of bolts are passed, are provided in the outer cylinder,
a plurality of screw holes, into which the plurality of bolts are screwed, are provided in the first peripheral part,
a stopper serving as the axial force reducing means is disposed at a bottom portion of at least one of the plurality of screw holes, and
the gap is formed between the head portion of the bolt and the bolt fastening face by a tip end portion of the bolt coming into contact with the stopper.

5. The vacuum pump according to claim 1, wherein:
the axial force reducing means further includes an elastic member disposed in the gap.

6. The vacuum pump according to claim 1, wherein:
a count of the at least one of the plurality of bolts to which the axial force reducing means is provided is less than a count of the plurality of bolts to which the axial force reducing means is not provided.

7. The vacuum pump according to claim 1, wherein:
a count of the at least one of the plurality of bolts to which the axial force reducing means is provided is greater than a count of the plurality of bolts to which the axial force reducing means is not provided.

8. The vacuum pump according to claim 1, wherein:
a count of the at least on of the plurality of bolts to which the axial force reducing means is provided is equal to a count of the plurality of bolts to which the axial force reducing means is not provided.

9. A vacuum pump comprising:
a rotating body;
an outer cylinder that accommodates the rotating body;
a first peripheral part that is disposed on an outer perimeter side of the rotating body and concentrically with the outer cylinder;
a second peripheral part that is disposed between the outer cylinder and the first peripheral part in an axial direction; and
a bolt that fastens the outer cylinder, the first peripheral part and the second peripheral part,
wherein a gap is formed between a head portion of the bolt and a bolt fastening face that is an outer face of the outer cylinder and that faces the head portion of the bolt, so that the axial force of the bolt does not act on the outer cylinder and the second peripheral part.

* * * * *